United States Patent
Batson (10) Patent No.: US 12,028,672 B2
(45) Date of Patent: Jul. 2, 2024

(54) HEADSET AND APPLICATION CONTROL BASED ON LOCATION DATA

(71) Applicant: GN Audio A/S, Ballerup (DK)

(72) Inventor: Kevin A. Batson, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 132 days.

(21) Appl. No.: 17/770,947

(22) PCT Filed: Dec. 23, 2020

(86) PCT No.: PCT/EP2020/087826
§ 371 (c)(1),
(2) Date: Apr. 21, 2022

(87) PCT Pub. No.: WO2021/136739
PCT Pub. Date: Jul. 8, 2021

(65) Prior Publication Data
US 2022/0417640 A1     Dec. 29, 2022

(30) Foreign Application Priority Data

Dec. 30, 2019  (DK) .......................... PA 2019 01561

(51) Int. Cl.
*H04R 1/10*     (2006.01)
*H04W 4/029*    (2018.01)

(52) U.S. Cl.
CPC ......... *H04R 1/1041* (2013.01); *H04R 1/1083* (2013.01); *H04W 4/029* (2018.02)

(58) Field of Classification Search
CPC .... H04R 1/1041; H04R 1/1083; H04W 4/029
See application file for complete search history.

(56) References Cited

U.S. PATENT DOCUMENTS

2015/0382097 A1  12/2015  Åstrand
2016/0125869 A1  5/2016  Kulavik et al.
(Continued)

FOREIGN PATENT DOCUMENTS

EP    2700907 A2    2/2014
WO    2017117288 A1  7/2017

OTHER PUBLICATIONS

International Search Report and Written Opinion issued in PCT/EP2020/087826, dated Feb. 26, 2022, 10 pages provided.

*Primary Examiner* — Simon King
(74) *Attorney, Agent, or Firm* — HSML P.C.

(57) ABSTRACT

Disclosed is a headset for audio communication, a software application for an electronic device associated with a headset, and a method for controlling a headset feature. The headset is configured to be worn by a user. The headset comprises a speaker for sound transmission into the user's ear, a transceiver or a radio communication unit for communication with an external device, a connection to a location-based service software, the location-based service software is configured for controlling at least one headset feature based on location data of the headset, and a processing unit. The processing unit is configured for enabling the location-based service software to detect if the current location data of the headset indicates a change in location data corresponding to a certain change criterion and changing the at least one headset feature, if a change criterion associated with the change in location data is satisfied.

8 Claims, 7 Drawing Sheets

(56) References Cited

U.S. PATENT DOCUMENTS

| | | |
|---|---|---|
| 2017/0060880 A1 | 3/2017 | Sabin |
| 2017/0147281 A1 | 5/2017 | Klimanis |
| 2017/0194020 A1* | 7/2017 | Miller ................ G10L 21/0272 |
| 2018/0034951 A1 | 2/2018 | Boesen |

* cited by examiner

HEADSET AND APPLICATION CONTROL BASED ON LOCATION DATA

FIELD

The present disclosure relates to a headset for audio communication, a software application for an electronic device associated with a headset, and a method for controlling a headset feature. The headset is configured to be worn by a user. The headset comprises a speaker for sound transmission into the user's ear, a transceiver or a radio communication unit for communication with an external device, a connection to a location-based service software, the location-based service software is configured for controlling at least one headset feature based on location data of the headset, and a processing unit.

BACKGROUND

Headsets can be used in different situations. Users can wear their headset in many different environments, e.g. at work in an office building, at home when relaxing, on their way to work, in public transportation, in their car, when walking or running in the park, in the fitness centre etc. Furthermore, headsets can be used for different purposes. The headset can be used for audio communication, such as telephone calls. The headset can be used for listening to music, radio etc. The headset can be used as a noise cancelation device in noisy environments etc.

Depending on which environment or situation the user is in when wearing the headset, and/or depending on the purpose of wearing the headset, different audio settings in the headset may be relevant. Audio settings in a headset may e.g. be sound mode settings, noise cancellation and equalization etc.

Today, users wearing headsets need to change headset settings themselves or need to rely on the headset performing a satisfactory acoustic detection of the environment to decide headset audio settings.

U.S. Pat. No. 9,830,930 B2 discloses systems and methods providing ambient awareness. An example method includes receiving an acoustic signal representing at least one captured ambient sound and determining that at least one triggering event has occurred based at least on the acoustic signal, a user profile, and a user context. In response to the determination, the method proceeds to modify, based on the at least one triggering event, the acoustic signal which represents the at least one captured ambient sound. The modified acoustic signal is provided to at least one ear canal of a user. In an exemplary embodiment, ambient sounds are selectively passed through automatically to a user based on certain triggering events, allowing a user to be able to hear sounds outside of headset while the user is wearing the headset. The triggering events may be selected by the user, for example, using a smartphone application.

US 2017060880 A1 discloses a computer-implemented method that includes receiving identification information associated with a geographic location. The identification information includes one or more features that affect an acoustic environment of the geographic location at a particular time. The method also includes determining one or more parameters representing at least a subset of the one or more features, and estimating at least one acoustic parameter that represents the acoustic environment of the geographic location at the particular time. The at least one parameter can be estimated using a mapping function that generates the estimate of the at least one acoustic parameter as a weighted combination of the one or more parameters. The method further includes presenting, using a user-interface displayed on a computing device, information representing the at least one acoustic parameter estimated for the geographic location for the particular time.

US 2016125869 A1 discloses a system comprising automatic noise cancellation circuitry and interface circuitry operable to provide an interface via which a user can configure which sounds said automatic noise cancelling circuitry attempts to cancel and which sounds said automatic noise cancelling circuitry does not attempt to cancel. The interface circuitry may be operable to provide an interface via which a user can select a sound to whitelist or blacklist. The interface circuitry may be operable to provide an interface via which a user can increase or decrease an amount of noise cancellation that is desired. The interface circuitry may be operable to provide an interface via which a user can select from among three or more levels of noise cancellation.

US 2018034951 A1 discloses an earpiece including an earpiece housing, a speaker associated with the earpiece housing, a microphone associated with the earpiece housing a wireless transceiver disposed within the earpiece housing and a processor disposed within the earpiece housing. The earpiece is configured to connect with a vehicle using the wireless transceiver and after connection with the vehicle automatically enter a driving mode. In the driving mode, the earpiece senses ambient sound with the microphone and reproduces the ambient sound at the speaker and the driving mode may be locked in place during driving.

Thus, there is a need for a headset and a method allowing for improved headset settings.

SUMMARY

Disclosed is a headset for audio transmission. The headset is configured to be worn by a user. The headset comprises a speaker for sound transmission into the user's ear. The headset comprises a communication unit for communication with an external device. The headset comprises a connection to a location-based service software, the location-based service software is configured for controlling at least one headset feature based on location data of the headset. The headset comprises a processing unit. The processing unit is configured for obtaining current location data of the headset.

The processing unit is configured for enabling the location-based service software to detect if the current location data of the headset indicates a change in location data corresponding to a certain change criterion. The processing unit is configured for changing the at least one headset feature, if a change criterion associated with the change in location data is satisfied.

The communication between headset and external device may be wired or wireless.

The change criterion may be a more rapid or slow change in location data for the headset, such as GPS coordinates, the distance to some kind of obstacle or construction, such as the distance decreasing to below a threshold for which the headset user needs to enhance attention or focus etc. The change may be caused by the user's own movement when wearing the headset, such as when changing pace or stopping.

For example, when the user is walking or running, e.g. doing exercise, and for some reason changes pace it may indicate that he or she needs to have sharpened or enhanced focus, attention and/or awareness to traffic, siren vehicles or emergency vehicles such as ambulances, fire brigade vehicles or police cars, intersections and crossing traffic. Inconsistent pace or stopping might indicate obstacles and the location-based service (LBS) will detect that change. When approaching intersections, roads with heavy crossing traffic, pedestrian zones, especially if the user is riding a bike, motorbike or driving in a car or other vehicle, the user needs to have more attention to surroundings especially sounds, so in these situations a larger amount of the surrounding/ambient sounds needs to be let through to the user's ear to make the user be more aware, e.g. changing the headset's sound mode to a hear-through mode.

Thus, it is an advantage that the headset is configured for automatically changing headset features, such as sound modes, when the user wearing the headset changes way of moving or movement pattern.

It is an advantage that the user wearing the headset in a location do not have to interact with the headset itself and/or with his/her smart phone, when headset settings need to be changed. The headset automatically changes the headset features or settings in accordance with the user's preferences, when a change criterion is satisfied.

Even though acoustic detection can be used as a trigger for changing the audio settings in a headset, audio research has big challenges with acoustic detection of the environment. Thus, in prior art, the acoustic environment is analysed and settings are made which fits the acoustic environment. However as acoustic detection has big challenges and is not always precise, satisfactory or correct, the resulting audio setting may not be optimal for the user.

Thus, it is an advantage of the present headset that users can define automatic settings themselves. Furthermore, it is an advantage that the users can define the headset settings based on way of moving or movement pattern and their own preferences, instead of based on a detected acoustic environment.

Thus, it is an advantage of the present headset, software application and method, that these provide a way to get automated user scenario and location-relevant settings, and instead of using prior art acoustic detection, a change in location data is used in the present invention. This change in location data may be caused by the user's physical movement, and therefore, when a user is wearing the headset, the change criterion for changing the headset feature is satisfied if a change in the user's physical movement or movement pattern is detected.

The location-based service (LBS) may be arranged as an installed software application, e.g. app, on the external device. The external device may be connected with the headset. Thus, the headset may be configured to communicate with the external device.

The location-based service (LBS) may be arranged as a cloud service, which the headset is configured to communicate with directly. Alternatively, the location-based service (LBS) may be loaded locally in the headset.

The headset may be a tethered headset or an untethered headset. A tethered headset is connected, e.g. wired or wirelessly, to the external device, e.g. in the form of an electronic device acting as a host for the headset, where the electronic device is providing an internet connection. An untethered headset is configured for internet connection itself, thus an untethered headset is WiFi/3G/4G/LTE/5G enabled and thus host-device free.

The location-based service may be a back-end application for the headset.

The processing unit is configured for enabling the location-based service software to detect if the current location data of the headset indicates a change in location data corresponding to a certain change criterion. The processing unit is configured for changing the at least one headset feature, if a change criterion associated with the change in location data is satisfied Furthermore, the user may set or define his/her own preferences associated with change of the at least one headset feature. The preferences may regard sound mode, sound level, amount of ambient sound allowed through to the user's ear(s), noise cancellation, which notifications are allowed through, which phone calls are allowed through, etc.

The preferences may be set, defined, changed, or managed by the user in a user interface.

If the headset is untethered, and the user wishes to set his/her preferences by using, e.g. only, the headset, the user interface for this action or setting may be performed via the user interface of the headset. The headset user interface may be a button-, gesture- and/or voice-input user interface. Thus, the user may provide button-, gesture- and/or voice-input for defining or setting his/her preferences.

Thus, the user may provide the settings on how the change in location data should apply.

Alternatively, if the headset is tethered, the user may provide his/her preferences via a connected electronic device, e.g. host device. The connected device may have a display, such as a touch screen, displaying a user interface on which the user can provide the desired preferences. These preferences may be provided on this visual user interface before the user is using or wearing the headset. The preferences may also be provided on the visual user interface while the user is using or wearing the headset during the user scenario that causes the preferences to change, if the user holds the connected electronic device in his/her hand or uses a hands-free kit while wearing the headset. In this case, the user can provide preference using touch gestures on the visual user interface on the connected electronic device.

Thus, it is an advantage that the user can define and set preference via a connected host electronic device and/or via the headset itself.

The external device, which the headset is configured for communication with, may be an electronic device, such as a handheld electronic device and/or a portable electronic device such as a smart device such as a tablet or smartphone, such as the user's smartphone. The external device may be a computer unit, such as a personal computer, a stationary computer etc. The external device may be a server, such as a cloud server.

The wireless communication unit may be a radio communication unit and/or a transceiver. The wireless communication unit may be configured for Bluetooth (BT) communication, for WiFi communication, for mobile telephone network such as 3G, 4G, LTE, 5G etc.

The connection to a location-based service software may be means for connecting to a location-based service software, and/or the headset may be configured for connecting to a location-based service software.

The headset feature may be a sound mode. Changing a headset feature may include changing a state of a headset feature, changing a sound mode setting, etc.

In some embodiments, the headset feature to be changed is a sound mode of the headset, whereby the sound mode is changing from a first sound mode to a second sound mode.

In some embodiments, the headset feature to be changed is a sound mode setting of the headset, whereby the sound mode setting is changing from a first sound mode to a second sound mode.

In some embodiments, at least one of the first and second sound modes is a hear-through mode.

In some embodiments, the change of the headset feature is performed by a call control communication protocol, and wherein the call control communication protocol comprises a Bluetooth-SCO protocol.

Synchronous connection-oriented (SCO) link is the type of radio link used for voice data. An SCO link is a set of reserved timeslots on an existing ACL (Asynchronous Connection-Less) link. Each device transmits encoded voice data in the reserved timeslot. There are no retransmissions, but forward error correction can be optionally applied. SCO packets may be sent every 1, 2 or 3 timeslots.

Besides the current Bluetooth-SCO protocol, a headset manufacturer protocol may be added to the call control communication protocol.

In some embodiments, the change of the headset feature is performed by a call control communication protocol; and wherein the call control communication protocol comprises a protocol enabling sending commands from back-end applications and front-end applications to the headset, thereby changing the headset feature.

The call control communication protocol may be the current Bluetooth-SCO protocol and adding to this a headset manufacturer protocol. Thus, the headset manufacturer may be enabled by the protocol to send commands from the back-end applications and/or from the front-end applications to the headset. The back-end applications may be e.g. cellular data/Wi-Fi. The front-end applications may be location-based device control, where the user defines which third-party app(s) on the electronic device, e.g. a smartphone, should link with this location-based device control service. The location-based device control may be provided by the headset manufacturer.

In some embodiments, the location-based service software is further configured for controlling triggers and/or notifications from third-party applications based on location data of the headset.

In some embodiments, the location data of the headset affects a change in settings in applicable third-party applications on the electronic device based on the user's predefined settings.

For example, if the user listens to music in the headset, and where the music is streamed from a music app, the music app may change from playing up-tempo music to playing soft music or turn down high volume level music to a low volume level music when the user approaches a location of special attention decided by the LBS or user's own behavior such as changing pace of movement.

The headset may be configured for providing an audio notification in the speaker based on the determination of location.

In some embodiments, the location data of the headset is determined in the headset, when the headset comprises means for location determination; and/or wherein the location data of the headset is determined in the electronic device, when the electronic device comprises means for location determination.

The location determination may be performed, e.g. outdoor, by Global Positioning System (GPS) and/or WIFI by the headset itself or by the electronic device. The location determination may be performed, e.g. indoor by LTE, RFID etc. e.g. when moving from a still position at a desk to a moving around the office thereby having a greater need for being aware of sounds from the environment for avoiding collisions with other co-workers etc.

In some embodiments, the headset comprises an internet connection such that the headset is configured for connection to the internet.

The internet connection may be WIFI, 3G, 4G, LTE, 5G etc.

The processing unit is further configured for obtaining current location data of the headset. The current location of the headset may be obtained from a positioning system, such as a global positioning system such as GPS, and/or via Internet connection, such as WiFi, installed in the headset and/or in the associated or connected electronic device, such as a smartphone, and/or via a network mobile telephone network, such as 3G, 4G, LTE or 5G.

The processing unit is configured for enabling the location-based service software to detect if the current location data of the headset indicates a change in location data.

The preferences can be defined/set by the user for example using a user interface, such as a user interface on the headset itself, e.g. mechanical buttons etc., and/or such as a user interface on the connected electronic device, such as a software application, e.g. an app. The preferences may be predefined or preset by the user, e.g. at home before wearing the headset. The preferences may be defined or set by the user when wearing the headset, e.g. on location during a user scenario.

The processing unit is configured for changing the at least one headset feature, if a change criterion associated with a change in location data is satisfied, wherein the change of at least one headset feature is set/defined by the user. The processing unit may be configured for changing the headset feature itself and/or changing the state of the headset feature.

According to an aspect of the invention, it is an advantage if the location-based service software is further configured for controlling changes in settings in applicable third-party applications running on the external device based on location data of the headset.

According to a further aspect of the invention, it is an advantage if the location data of the headset is determined in the headset, when the headset comprises means for location determination; and/or wherein the location data of the headset is determined in the external device, when the external device comprises means for location determination.

It is a further advantage if in the headset according to the invention, the change of at least one headset feature is defined by the user.

According to an aspect of the invention, disclosed is a software application for an electronic device associated with a headset. The software application is configured for enabling a user to define settings for a location-based service software for controlling at least one headset feature based on location data of the headset. The software application comprises a user interface enabling the user to define a change of at least one headset feature based on the location-data of the headset, wherein the headset feature is configured to be changed, if a change criterion associated with a change in location data is satisfied The user interface enabling the user to define a change of a headset feature may be a first or second user interface, a headset feature user interface, a settings user interface etc.

The first user interface and the second user interface may be same user interface or different user interfaces.

The software application may be an app installed on the user's electronic device, such as smartphone. Using an app on the user's electronic device may be the case when the headset is Bluetooth connected to the electronic device which comprises a WiFi or cellular network connection.

According to an aspect of the invention, disclosed is a method for controlling a headset feature. The headset is configured to be worn by a user. The headset comprising a connection to a location-based service software, where the location-based service software is configured for controlling at least one headset feature based on location data of the headset. The method comprises obtaining current location data of the headset. The method comprises detecting if the current location data of the headset indicates a change in location data corresponding to a certain change criterion and changing the at least one headset feature, if a change criterion associated with the change in location data is satisfied.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

Figure 1:
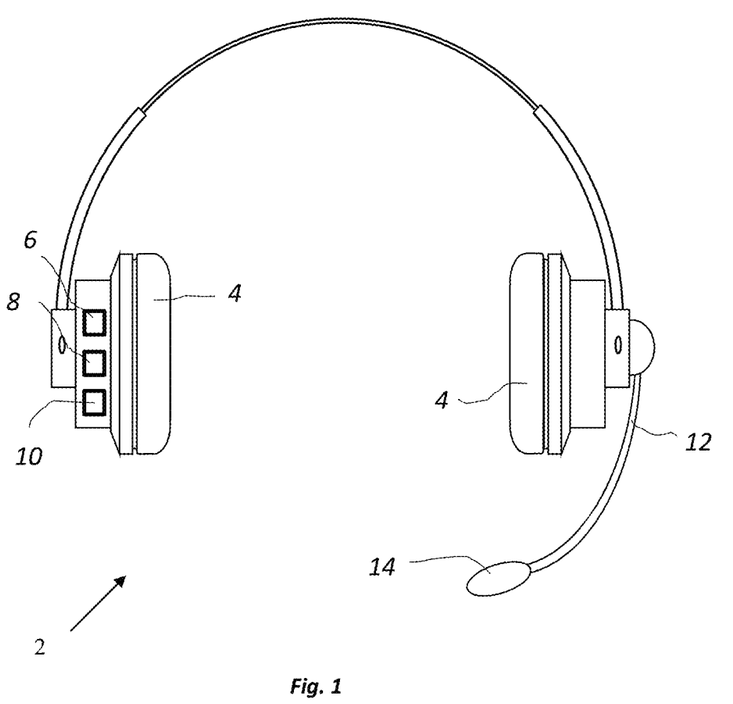
FIG. 1 schematically illustrates an example of a headset.

FIG. 1 schematically illustrates an example of a headset 2 for audio communication. The headset 2 is configured to be worn by a user. The headset 2 comprises at least one speaker 4 for sound transmission into the user's ear. The headset 2 comprises a wireless communication unit 6 for communication with an external device. The headset 2 comprises a connection 8 to a location-based service software. The location-based service software is configured for controlling at least one headset feature based on location data of the headset 2. The headset 2 comprises a processing unit 10. The processing unit 10 is configured for obtaining current location data of the headset 2, enabling the location-based service software to detect if the current location data indicates a change in location data corresponding to a certain change criterion and changing the at least one headset feature, if a change criterion associated with the change in location data is satisfied The criterion may be a more rapid or slow change in location data for the headset, such as GPS coordinates, the distance to some kind of obstacle or construction, such as the distance decreasing to below a threshold for which the headset user needs to enhance attention or focus etc. The change may be caused by the user's own movement when wearing the headset, such as when changing pace or stopping.

The change of at least one headset feature may be defined by the user, such as sound level and equalization and type of sound mode such as hear-through and noise cancellation etc.

The headset 2 may further comprise a microphone boom 12 with a microphone 14 allowing the user to perform phone calls with the headset 2.

Figure 2A:
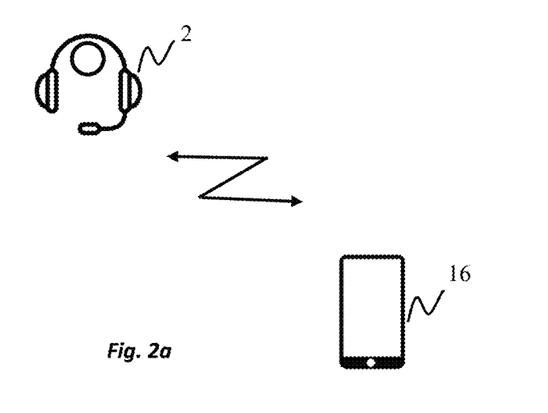
FIGS. 2a) and 2b) schematically illustrate examples of wireless communication between the headset and an external device.
Figure 2B:
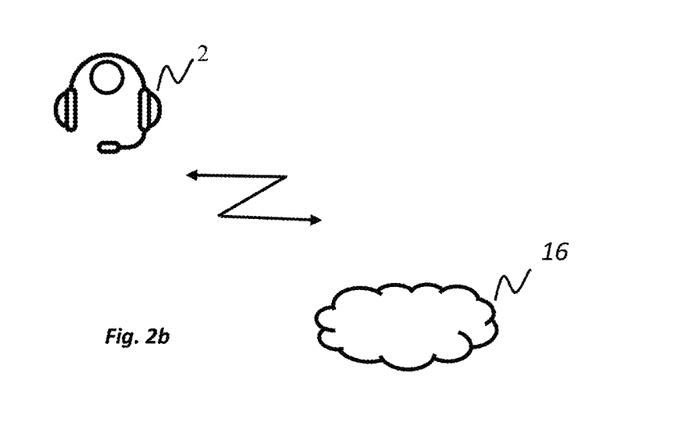

FIGS. 2a) and 2b) schematically illustrate examples of the wireless communication between the headset 2 and an external device 16.

In FIG. 2a) the external device 16 is an electronic device, such as a mobile device, such as a smartphone or tablet. The external device 16 may be an electronic device, such as the user's smartphone, if the headset 2 is not configured for Internet connection itself, e.g. a tethered headset 2.

In FIG. 2b) the external device 16 is a server, such as cloud server. The external device 16 may be a server, such as a cloud server, if the headset 2 is configured for Internet connection itself, e.g. an untethered headset 2.

Figure 3A:
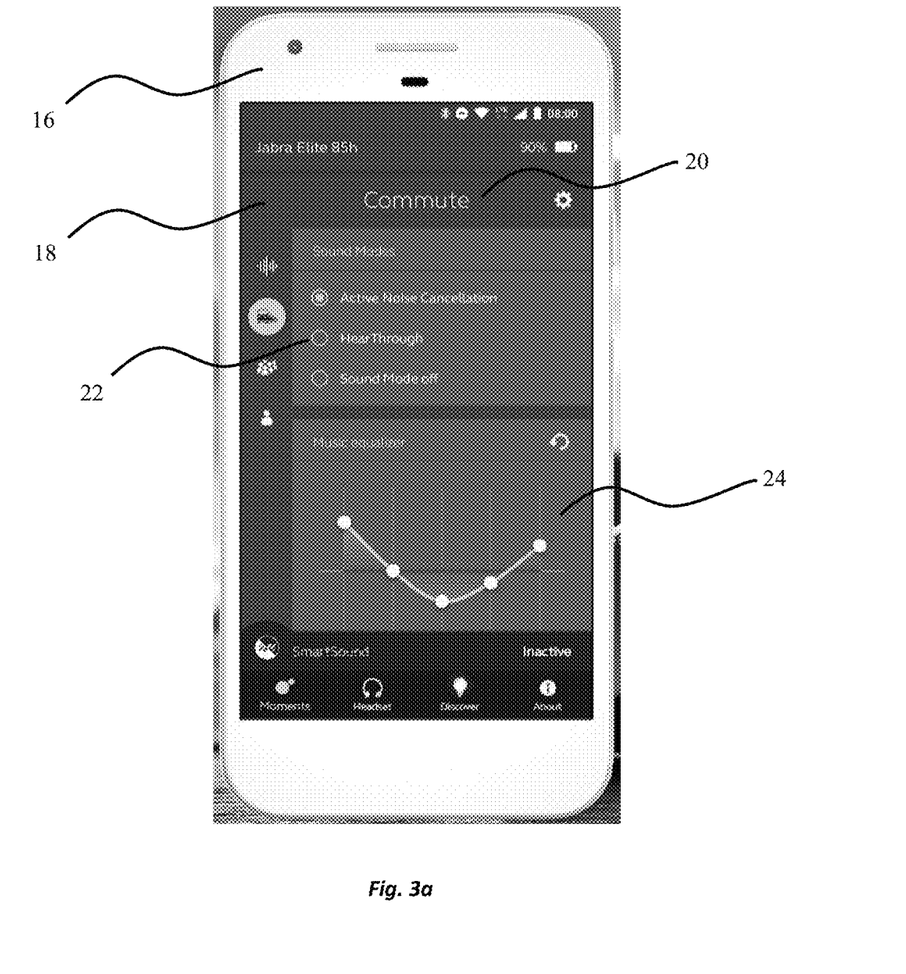
FIGS. 3a) and 3b) schematically illustrate examples of a user interface for defining one or more preferences.
Figure 3B:
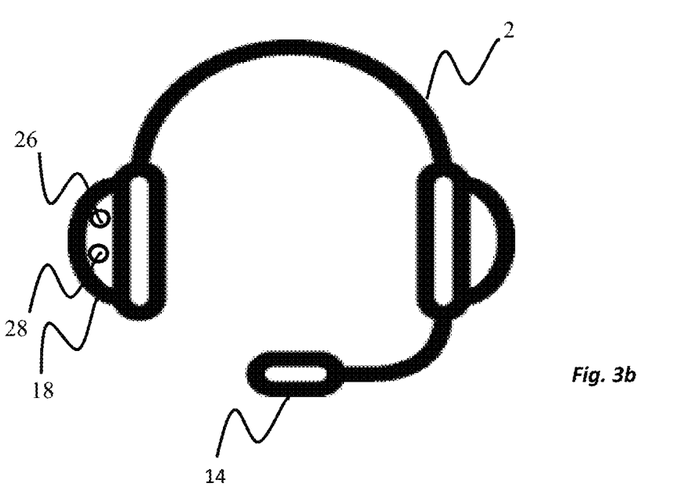

FIGS. 3a) and 3b) schematically illustrate examples of a user interface 18 for defining one or more user settings associated with one or more user situations.

FIG. 3a) schematically illustrates a visual user interface 18 on an external device 16 being an electronic device, such as a smart phone. The user may define one or more preferences 22, 24 for different user scenarios 20 in the user interface 18. The user may define the preferences by using a touch display on the electronic device.

Use scenario "Commute" is shown e.g. when the user is commuting to work, the default mode may be sound mode "Active noise cancellation" but a change in user situation may result in an automatically shift to a second sound mode. The user may predefine this second sound mode in the settings as "Hear through" mode, which means that changes in the user's moving pattern as detected by the LBS will cause the sound mode to change from the first sound mode to the second sound mode. The equalization settings might also be predefined to each mode according to the user's preference.

FIG. 3b) schematically illustrates a headset user interface 18 on the headset 2. The user may define one or more audio settings while the user is wearing the headset 2 by doing that when the user pushes a button 26 on the headset user interface 18 or making a voice prompt to the headset user interface 18 via microphone 14. The user can then toggle through different settings by continuously pushing the button 26. The user may again indicate to the headset user interface 18 that the setting shall be stored, e.g. by pressing button 26 for a longer period of time or by pushing another button 28 on the headset user interface 18 or making a voice prompt to the headset user interface 18 via microphone 14. Thus, the headset 2 may comprise buttons 26, 28 on the headset user interface 18, voice control, gesture control of the headset etc.

Figure 4:
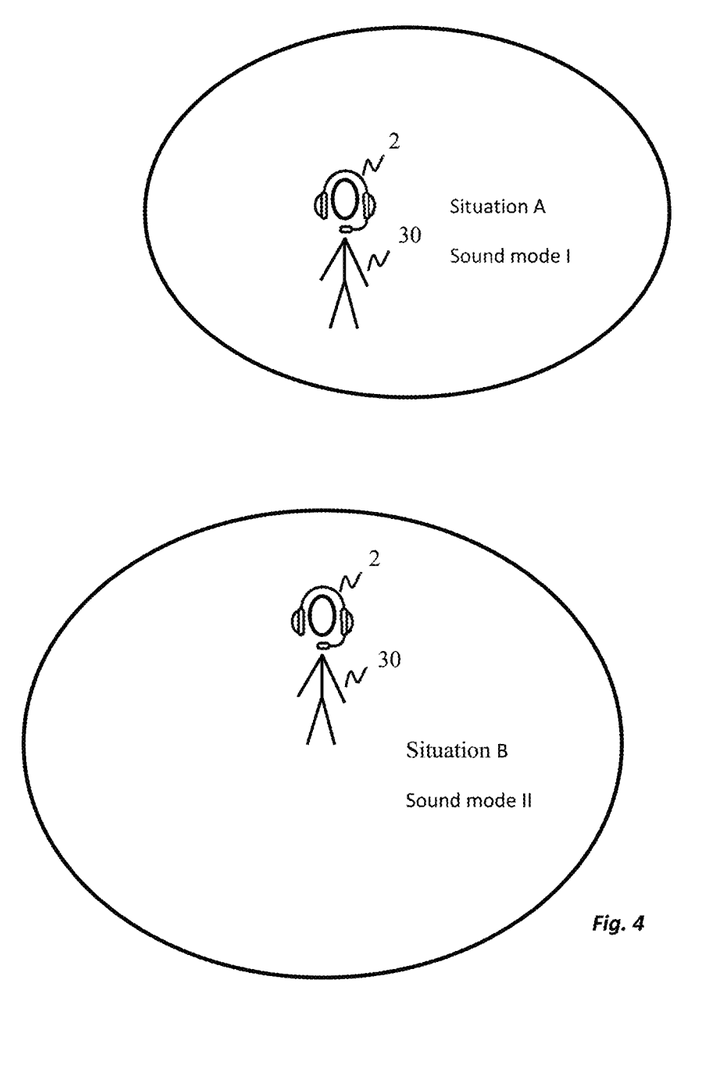
FIG. 4 schematically illustrates an example of a user wearing a headset in different use situations.

FIG. 4 schematically illustrates an example of a user 30 wearing a headset 2 in specific use situations.

The upper part of FIG. 4 shows the user 30 in a use situation called Situation A. The user is wearing the headset 2. The user 30 has beforehand, see FIGS. 3a) and 3b), defined that in Situation A, the headset feature should be sound mode I, e.g. called "Music and noise cancellation". Situation A may for example be the user commuting to work or doing exercise by walking, running or biking etc. at a steady pace where the user likes to listen to music in his/her headset 2 without being disturbed by ambient sound.

The lower part of FIG. 4 shows the user 30 in another situation called Situation B. The user is wearing the headset 2. The user 30 has beforehand, see FIGS. 3a) and 3b), defined that in Situation B, the headset feature should be sound mode II, e.g. called "Hear-through". Situation B may for example be that the user suddenly stops, increases pace or start moves with inconsistent pace this might indicate that the user has come across some kind of obstacle where he or she needs to pay attention, e.g. an emergency vehicle, such as an ambulance is approaching or an accident has occurred blocking the way or a traffic jam is affecting the pace of the user. It could also be the user approaching an intersection with crossing traffic or a pedestrian crossing or zone, where the user needs to slow down or stop to be aware of other road users where the LBS may have the information about this, such as GPS coordinates, and on basis of that automatically changes the mode of the headset, the criterion being a certain distance to the specific intersection or crossing or other obstacle. Sound mode II may be a hear-through mode providing an amount of the ambient sound to the user's ear, so that he or she is more aware of the surroundings.

Figure 5:
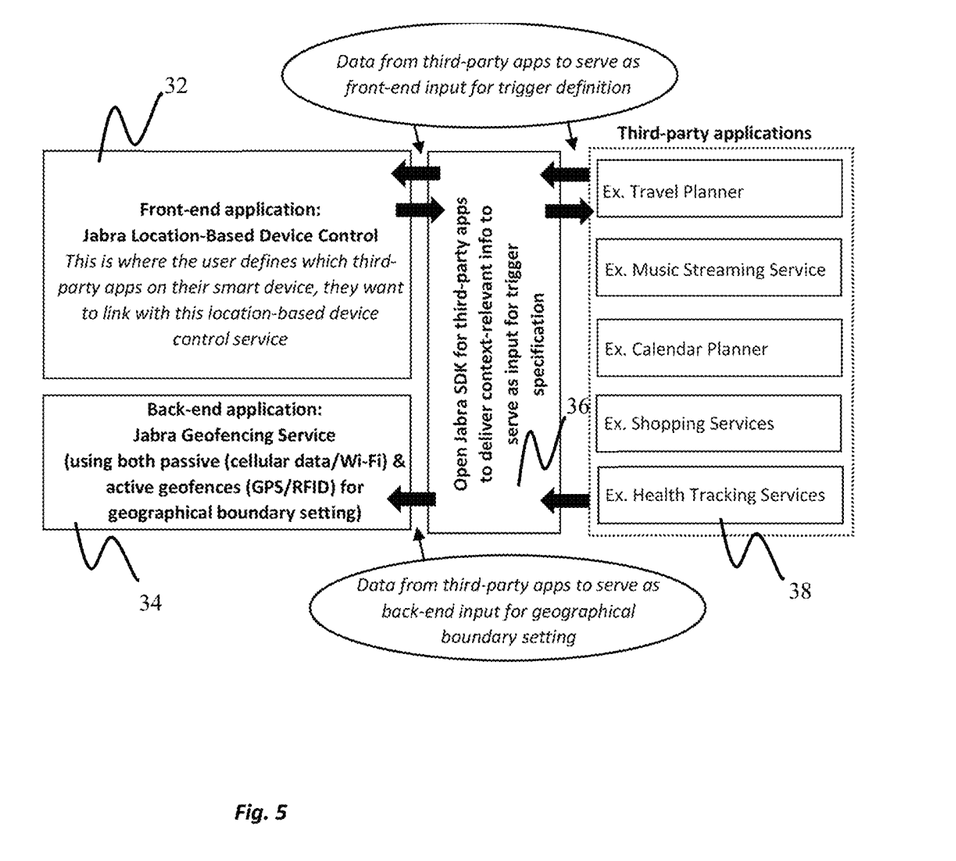
FIG. 5 schematically illustrates an example of input between front-end applications, back-end applications, a headset manufacturer SDK (software development kit) and third-party applications.

FIG. 5 schematically illustrates an example of input between front-end applications 32, back-end applications 34, a headset manufacturer SDK 36 and third-party applications 38.

The headset manufacturer software development kit (SDK or devkit) may be a set of software development tools that allows the creation of applications for a certain software package, software framework, hardware platform, computer system, video game console, operating system, or similar development platform. To enrich applications with advanced functionalities, advertisements, push notifications, and more, app developers may implement specific software development kits. Some SDKs are critical for developing a platform-specific app.

An SDK can take the form of a simple implementation of one or more application programming interfaces (APIs) in the form of on-device libraries to interface to a particular programming language, or it may be as complex as hardware-specific tools that can communicate with a particular embedded system. Common tools include debugging facilities and other utilities, often presented in an integrated development environment (IDE). SDKs may also include sample code and technical notes or other supporting documentation such as tutorials to help clarify points made by the primary reference material.

Thus, the headset manufacturer SDK may be an open software made available such that third part apps may communicate with the back- and front-end applications, on different operating systems, such as Android, IOS etc., and which enables to receive and act on data to control the headset features. The front-end application 32 may be a software application e.g. an app, where the user can define preferences in the form of sound modes, wherein certain headset features and/or headset settings can be defined or set to provide rules. For example, a desired Sound Mode level can be defined for a certain use situation in the front-end application. A sound mode level may for example be a "hear through level" which the user can set for e.g. the use situation "Commute" or "Exercise". The front-application 32 may be where the user defines which third-party applications 38 on the associated electronic device, e.g. smart device such as smartphone or tablet, that the user wants to link with the location-based device control service.

The user's headset may then automatically, via the back-end application 34, know when a change in location data may automatically trigger a headset feature change or state change in the headset. This headset feature change or state change can affect all or only some selected headset features, this depends on user preference settings.

The back-end applications 34 may be location based services using cellular networks, WiFi, and/or GPS for location determination setting.

The automated state change in the headset may use the same communication 'route' as used for call control today. Thus, the current Bluetooth SCO-protocol may be used. Furthermore, a new protocol, e.g. a headset manufacturer protocol, may be added on top of the current Bluetooth-SCO protocol, which may enable the headset manufacturer SDK 36, to send commands from the back-end applications 34 and/or the front-end application 32 to the headset, with the result of the headset automatically changing settings. Thus, the headset manufacturer SDK 36 may provide that third-party applications 38 can deliver context-relevant information to serve as input for trigger specification. Data from third-party applications 38 can be used to serve as front-end application 32 input for trigger definition. Data from third-party applications 38 can be used to serve as back-end application 34 input for location based settings.

For example, if the user has set a headset feature being a Sound Mode, e.g. a hear-through sound mode for the headset in a specific situation, the effect of changing situation as explained earlier, may be that the headset automatically—without the user having to give input to neither headset nor front-end application—change from one Sound Mode to another Sound Mode.

Setting triggers for when to change a headset feature may happen in the front-end application 32. Triggers may effect only the headset's generic/built-in settings/features. Alternatively and/or additionally, the triggers can effect change of settings in applicable third-party applications 38 installed on the user's electronic device, e.g. smart phone.

The third-part applications 38 may for example be Travel Planner, Music Streaming Service, Calendar Planner, Shopping Services, Health Tracking Services etc.

Thus, the user changing use scenario can also create a change in for example a planned travel route, change music tracks/playlists, effect calendar content, alter/activate shopping push notifications or purchase plans or e.g. affect health states/recommendations etc., which are all related to third-party applications 38. In relation to planned travel route, the headset may pair information on the time of changing use situation due to an unforeseen obstacle, e.g. traffic jam, from back-end application with information from planned travel route. A trigger or consequence may be, that the user may get a voice notification in the headset, if the planned travel conflicts with actual time and/or location. This may furthermore provide that a 'reroute advice' or 'speed-up-pace advice' is given to the user via push notifications, such as voice prompts, in the headset.

For example, the user can define that in certain situations, e.g. when exercising/running near an intersection, the user is not interested in being approachable via phone calls from one or more predefined contacts.

Figure 6:
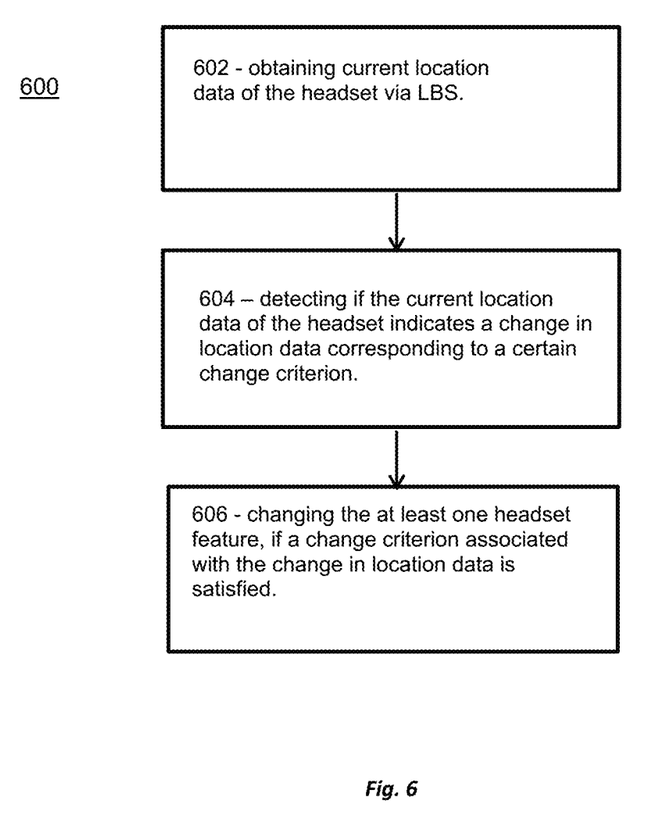
FIG. 6 schematically illustrates an example of a method in a headset for controlling a headset feature.

FIG. 6 schematically illustrates an example of a method 600 in a headset 2 for controlling a headset feature. The headset is configured to be worn by a user. The headset comprises a connection to a location-based service software, where the location-based service software is configured for controlling at least one headset feature based on location data of the headset.

The method 600 comprises the following steps.

In step 602 current location data of the headset is obtained via a location-based service (LBS).

In step 604, the method comprises detecting if the current location data of the headset indicates a change in location data corresponding to a certain change criterion.

In step 606, the method comprises changing the at least one headset feature, if a change criterion associated with the change in location data is satisfied. The change criterion may be the same as described earlier in relation to the headset and software application embodiments.

Although particular features have been shown and described, it will be understood that they are not intended to limit the claimed invention, and it will be made obvious to those skilled in the art that various changes and modifications may be made without departing from the scope of the claimed invention. The specification and drawings are accordingly to be regarded in an illustrative rather than restrictive sense. The claimed invention is intended to cover all alternatives, modifications and equivalents.

LIST OF REFERENCES 2 headset
4 speaker
6 wireless communication unit
8 connection to location-based service software
10 processing unit
12 microphone arm
14 microphone
16 external device
18 user interface
20 user scenario
22 sound mode settings
24 equalizer settings
26 first button on headset user interface
28 second button on headset user interface
30 headset user
32 front-end application
34 back-end application
36 headset manufacturer SDK (software development kit)
38 third-party applications
600 method
602 method step of obtaining current location data of the headset
604 method step of detecting if the current location data of the headset indicates a change in location data corresponding to a certain change criterion.
606 method step of changing the at least one headset feature, if a change criterion associated with the change in location data is satisfied.

The invention claimed is:

1. A headset for audio communication, the headset configured to be worn by a user, the headset comprising:
 a speaker for sound transmission into the user's ear;
 a communication unit for communication with an external device;
 a connection to a location-based service software, the location-based service software is configured for controlling at least one headset feature based on location data of the headset;
 a processing unit configured for:
  obtaining current location data of the headset;
 enabling the location-based service software to detect if the current location data of the headset indicates a change in location data corresponding to a certain change criterion;
 changing the at least one headset feature, if a change criterion associated with the change in location data is satisfied,
  wherein the changing of the headset feature is performed by a call control communication protocol; and
  wherein the call control communication protocol comprises a protocol enabling sending commands from back-end applications and front-end applications to the headset, thereby changing the headset feature.

2. A headset according to claim 1, wherein when a user is wearing the headset, the change criterion for changing the headset feature is satisfied if a change in the user's physical movement is detected.

3. A headset according to claim 1, wherein the headset feature to be changed is a sound mode setting of the headset, whereby the sound mode setting is changing from a first sound mode to a second sound mode.

4. A headset according to claim 3, wherein at least one of the first and second sound modes is a hear-through mode.

5. A headset according to claim 1, wherein the location-based service software is further configured for controlling changes in settings in applicable third-party applications running on the external device based on location data of the headset.

6. A headset according to claim 1,
 wherein the location data of the headset is determined in the headset, when the headset comprises means for location determination; and/or
 wherein the location data of the headset is determined in the external device, when the external device comprises means for location determination.

7. A headset according to claim 1, wherein the change of at least one headset feature is defined by the user.

8. A method for controlling a headset feature, the headset is configured to be worn by a user, the headset comprising a connection to a location-based service software, the location-based service software is configured for controlling at least one headset feature based on location data of the headset; the method comprises:
 obtaining current location data of the headset;
 detecting if the current location data of the headset indicates a change in location data corresponding to a certain change criterion
 changing the at least one headset feature, if a change criterion associated with the change in location data is satisfied,
  wherein the changing of the headset feature is performed by a call control communication protocol; and
  wherein the call control communication protocol comprises a protocol enabling sending commands from back-end applications and front-end applications to the headset, thereby changing the headset feature.

* * * * *